Figure 1:
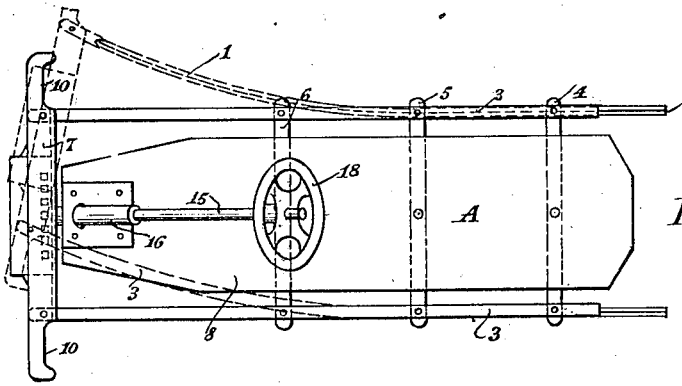

W. M. WOODS.
STEERING GEAR FOR SLEDS.
APPLICATION FILED JULY 2, 1915.

1,256,417. Patented Feb. 12, 1918.

UNITED STATES PATENT OFFICE.

WILDMAN M. WOODS, OF NEWTON, IOWA.

STEERING-GEAR FOR SLEDS.

1,256,417.     Specification of Letters Patent.     Patented Feb. 12, 1918.

Application filed July 2, 1915. Serial No. 37,642.

*To all whom it may concern:*

Be it known that I, WILDMAN M. WOODS, a citizen of the United States, residing at Newton, in Jasper county, Iowa, have invented new and useful Improvements in Steering-Gear for Sleds, of which the following is a specification, reference being had to the drawings.

My invention relates to gear for more conveniently guiding coasting sleds, and has for its main object the production of such steering gear which may be easily operated from the seat of the sled by the hands. Another object is the production of such gear with as few parts as possible, and these assembled in a simple, convenient and practical manner.

With these and other objects in view, attention is called to the accompanying drawings, to be considered as a part of this specification, and wherein Figure I represents a top plan view of the steering-gear as attached to a sled, showing the normal straight-forward direction of the sled in solid lines, and also by dotted lines how the sled may be guided to either side by correspondingly turning the steering wheel and thereby bending the runners. Fig. II is a side elevation. Fig. III is a front elevation. Fig. IV is a bottom plan view of the frontal portion of the sled showing the rack and sprocket attachments.

Referring particularly to the drawings, A represents a sled as an entirety and equipped with my improved steering gear. The sled A is made up of the two runners 1 curved at the forward ends, the supports 2, the two side bars 3, the cross-bars 4, 5 and 6 and the front bar 7, all assembled rigidly together, except that the runners 1 have a certain degree of flexibility to permit them to bend or curve sidewise to steer the sled and the front ends of the runners are secured to the front bar, 7, by single pivot bolts, 7ª, to allow the runner ends to rock on the front bar coincidently with the bending or curving of the runners. The one-piece top board 8 is secured firmly to the two rear-most cross bars 4 and 5, but is left free and in sliding contact only with the front cross-bar 6. The forward end 9 of the top board 8 is somewhat tapered for the sake of appearance, and clears by a narrow space the inner edge of the front bar 7. The front bar 7 is provided with the foot rests 10. The front bar 7, is reinforced by a metal plate, 11, which is secured to the undersurface of the same by the bolts, 7ª, which also connect the front bar to the runners as shown in Fig. 4, the projecting extremities of the plate being shown in said Fig. 4, interposed between the runners and bar, 7, with the bolts passing through the three elements, the runner ends, the plate and the front bar, 7.

Figure 2:
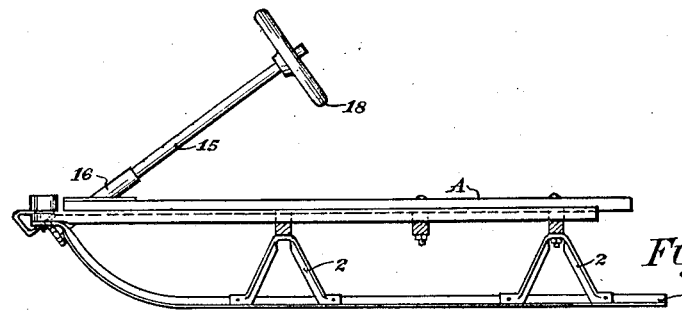
Figure 3:
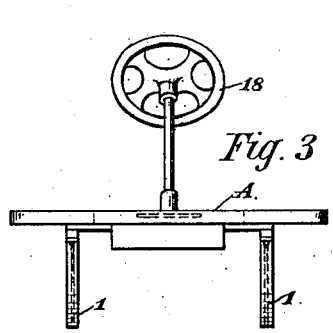

The plate is provided with a forward extension which preferably is narrower in width than the upper portion of said plate and also the top board, 8, and which bends diagonally downwardly and rearwardly as shown at, 11ª, in Fig. 2, and then upwardly and rearwardly as shown at, 11ᵇ, forming a bent forward extension of hollow triangular form.

The two portions, 11ª, and, 11ᵇ, are approximately in the form of a —V— when viewed from the end and are bent at a right angle to each other.

Figure 4:
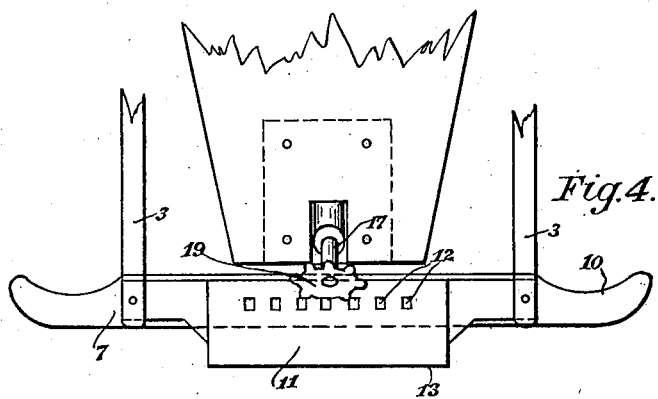

The object of this construction is to stiffen and strengthen the reinforcement and also to provide a slanting or oblique portion which forms a steering rack in which a series of slots and perforations, 12, are cut or otherwise formed that extend in a longitudinal row as shown in Fig. 4, and constitutes one member of the steering gear of the sled.

An opening is cut in the forward end of the top board which extends obliquely or at a slant and an oblique hollow or tubular steering post or column, 16, is suitably secured on the top board with its upper portion extending upwardly and rearwardly and its lower portion extending through the opening in a downward and forward direction as shown in Fig. 4.

A steering shaft, 15, is rotatably mounted in the hollow steering column and secured in place therein against longitudinal movement by cotter pins, 17,—as shown in Fig. 4, near the center of said figure. A metal supporting and reinforcing plate 17ª is securely fastened upon the top surface of the forward end of the top board, 6, by screws or other fasteners and serves to support and maintain the steering post, 16, rigidly in position. Upon the upper end of said steering shaft 15 is rigidly mounted the steering wheel 18. At the lower end of said steering shaft 15 is rigidly mounted the sprocket wheel 19, with its sprockets 20 adapted to exactly engage the transverse slots 12 cut in the face of the oblique portion, 11ᵇ. However, said transverse slots 12 are of a length somewhat greater than necessary to exactly accommodate the transverse width of the sprockets 20, so as to allow room for the forward play of said sprockets 20 within said slots 12, due to the axial shortening of the sled A as the runners 1 are bent to either side.

The rack, 11, is secured to the front bar, 7, in any suitable manner, or it may be made integral with said bar 7.

The metal stiffening plate, 11, has a three-fold function, it reinforces and strengthens the front bar, forms the rack of the steering gear, and provides a projecting guard and bumper at the front end of the sled.

In actual use it will be seen that by merely turning the steering wheel 18 to the side it is desired the sled itself to turn, the sprocket wheel 19 traverses the rack 11 in the opposite direction, thereby forcing the front-bar 7 to the side it is desired to turn the sled A, the runners 1 bending correspondingly in the same direction, thus accomplishing the desired result. It will also be noted that by virtue of the room allowed in the transverse slots 12 for the forward play of the sprockets 20, as the runners 1 bend to either side, means is provided for the smooth working of my improved steering gear under all conditions.

Although I have herein described and set forth certain specific manner and methods of constructing and assembling the elements of my invention, I reserve the right to modify same in minor details, not departing from the spirit of my invention, so as best to form my improved steering gear to meet all practical demands.

What I claim is:

1. In a device of the class described, a sled having a top board provided with an oblique opening near its front end and side runners, said runners being flexible to permit lateral steering movement, a transversely extending front bar pivoted to the front extremities of the side runners, a metal reinforcing plate secured to the front bar and having a middle portion bent in a hollow triangular form and with its lower rear part provided with a series of tooth receiving slots or perforations arranged in a longitudinal row, a tubular steering post or column extending obliquely through the top board with its upper portion projecting upwardly and rearwardly above the board and its lower portion fitting through the oblique opening in said top board and depending downwardly and forwardly, a steering shaft rotatably mounted in the steering post or column and having its upper portion projecting above said column, a steering wheel mounted on the upper projecting end of said shaft and a gear wheel mounted on the lower extremity of said shaft and having its teeth project into the slots or perforations in the oblique lower rear part of the extension of the metal reinforcing plate.

2. In a device of the class described, a sled construction comprising a top board, flexible side runners, a transverse front bar, a steering shaft rotatably mounted in the top board, and carrying a gear wheel, and a metal reinforcing plate secured to the front bar and having a rack coöperating with the gear wheel on the steering shaft, said plate in part projecting in front of the sled and forming a guard or bumper therefor.

WILDMAN M. WOODS.

Witnesses:
 Ed P. Malmberg,
 Florence E. Altemeier.